Nov. 19, 1968  F. JONKER  3,411,844
PROJECTION APPARATUS FOR SUPERPOSING A READOUT
GRID ON DATA FILM IMAGES
Original Filed Nov. 1, 1961
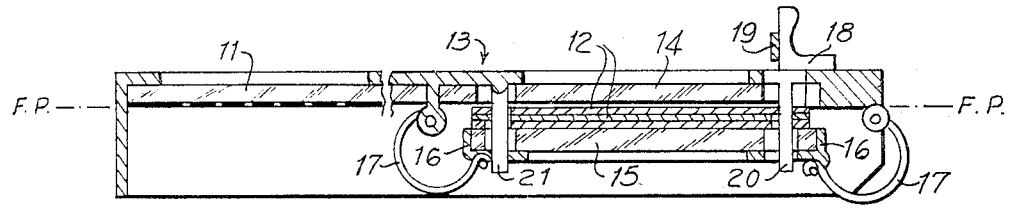
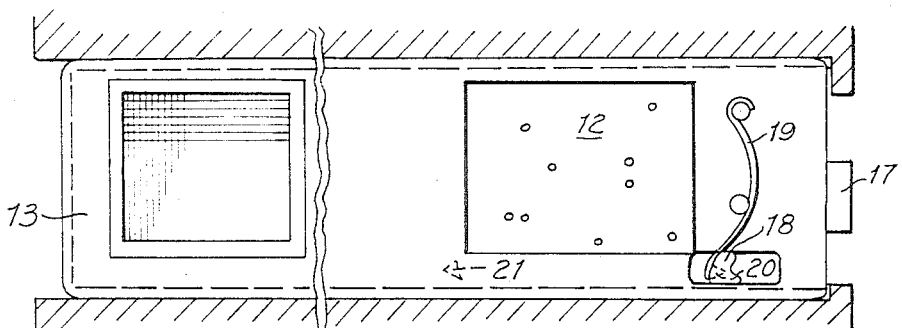
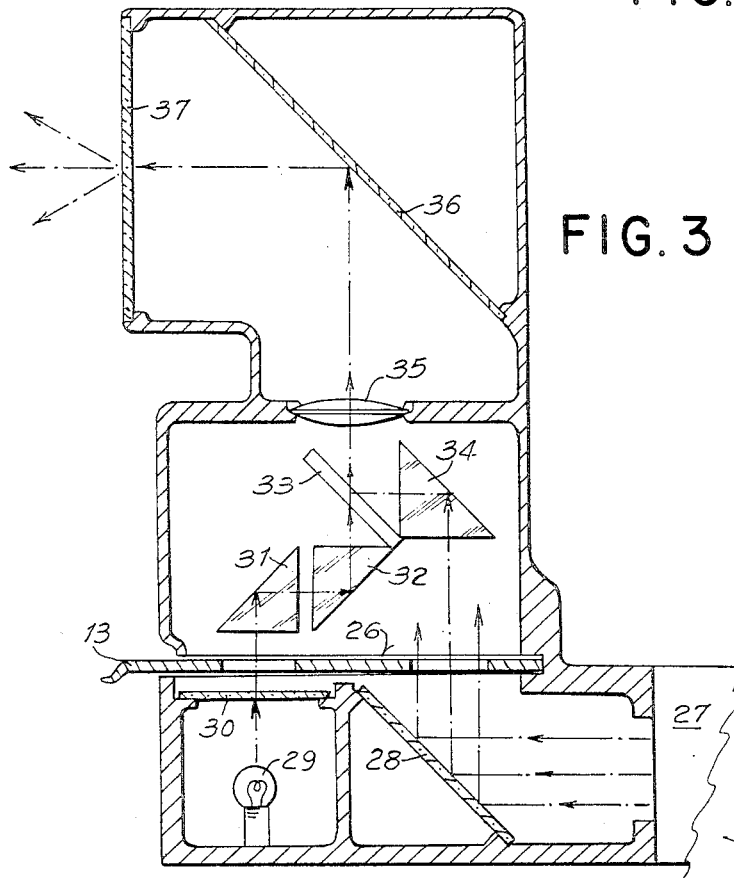
INVENTOR:
F. JONKER
Homer R. Montague
ATTORNEY / # 3,411,844
PROJECTION APPARATUS FOR SUPERPOSING A READOUT GRID ON DATA FILM IMAGES
Frederick Jonker, Washington, D.C., assignor to Jonker Business Machines, Inc., a corporation of Delaware
Original application Nov. 1, 1961, Ser. No. 150,114, now Patent No. 3,209,643. Divided and this application Oct. 5, 1965, Ser. No. 568,366
3 Claims. (Cl. 353—27)

ABSTRACT OF THE DISCLOSURE

Apparatus for the projection and viewing of the locations of light-transmitting data spots on a micro-image film, or on a superposed set of such films, with precise positional reference to a read-out grid. The film or films are positioned in one section of a unitary holder, and an accurate read-out grid is positioned in an adjacent section of the holder. The holder is insertable as a unit in the object plane of a projection viewer which provides for illumination of the films and grid, and which includes an optical system for deflecting their respective rays over a common optical path and focusing said rays, in accurate positional registration, on a common viewing screen.

---

The present invention is an improvement upon an earlier invention of the same category, filed Sept. 10, 1959, Ser. No. 839,242, now Patent No. 3,195,399, and is also a division of application Ser. No. 150,114, filed Nov. 1, 1961, now Patent No. 3,209,643.

In order to permit read-out of data from records of the peek-a-boo card type which have been miniaturized as described in the patents mentioned above, it is desirable to provide a read-out apparatus which can receive one or more of the reduced-size photographic records of such cards, and display them (with the plural records superimposed, where more than one is involved) in association with a read-out grid from which the coordinates of the visible light spots can be readily determined. The invention described herein provides a unitary holder which can receive one or more of such records, in a position adjacent to a read-out grid transparency also in the holder, together with a display projector having a beam-splitting and prism system by which the images of the light spots and of the grid are optically superimposed on a common projection screen. Accurate registration of the light spots and the grid are ensured in this way, without dependence upon the operator's ability to insert two different parts into separate projection regions of the display projector.

The manner in which these and other aims can be accomplished will be discussed with reference to the following figures:

FIG. 1 is a longitudinal sectional view of a holder in which superimposed film frames and the read-out grid are held next to each other.

FIG. 2 is a plan view of the holder, shown as inserted in a viewer whose frame portions are shown hatched.

FIG. 3 is a vertical sectional view of a viewer receiving the holder of FIGS. 1 and 2, and in which the image of the superimposed film frames, and the image of the read-out gird, are superimposed on a viewing screen.

In FIGS. 1 and 2 a miniature grid 11 and the superimposed miniature term cards 12 are placed side by side in a film holder 13. The grid 11 could be on a glass plate as shown in FIG. 1. The term cards 12 are pressed between a glass plate 14 and another glass plate 15 that could be cemented into a cover 16. Cover 16 compresses the term cards 12 against glass plate 14 under the pressure of, for example, two removable springs 17. Alignment is provided by the fixed pin 21 and the movable pin 20. Spring 19 pushes the head 18 of pin 20 to the right, thereby jamming pins 20 and 21 into the corners of the sprocket holes. The letters F.P. designate the focal plane in FIG. 1.

FIG. 3 shows the cross section of a viewer or reader for the film holder of FIGS. 1 and 2. The film holder 13 is inserted into slot 26. A source of light, preferably parallel light 27 throws its light on a mirror 28 from where it goes perpendicularly through the superimposed term cards. Next it is deflected in a prism 34 and reflected by a half-silvered mirror 33. This light then goes through lens 35 and is reflected by mirror 36. The image of the superimposed term cards thrown on rear projection screen 37 is then visible from the front of the viewer.

Another source of light 29 sends its rays through a diffuser 30 and through the grid in the holder 13 through prisms 31 and 32 and through the half-silvered mirror 33. At the half-silvered mirror 33 the light from the two sources 27 and 29 merges. As a result the images of the superimposed term cards and the grid will be in exact superimposition on the screen 37.

I claim:
1. Apparatus for the projection viewing of miniature data spot images in registration with a coordinate read-out grid, comprising a unitary holder securing a read-out grid transparency in position for optical projection, said holder including means for securing, in accurately positioned side-by-side relation to said grid transparency, at least one data spot film, a projector housing including illuminating means and means for removably receiving and positioning said holder in the path of illuminating rays, optical deflecting elements for deflecting the rays of light proceeding from said grid transparency and from said spot film into a common optical path, a projection screen, and a lens system for focusing the rays of said common optical path upon said projection screen, to produce an image of said film accurately superposed on an image of said read-out grid.

2. Apparatus in accordance with claim 1, in which the means for securing said data spot film to said holder comprises locating pins resiliently mounted on said holder to engage sprocket holes in said film.

3. Apparatus in accordance with claim 1, in which said holder includes at least one transparent plate resiliently urging the spot film towards a predetermined focal plane confocal with said read-out grid transparency.

References Cited
UNITED STATES PATENTS

| | | | |
|---|---|---|---|
| 1,821,626 | 9/1931 | Fleischer | 88—24 |
| 2,600,261 | 6/1952 | Pennington | 88—24 |
| 2,765,704 | 10/1956 | Mottu | 88—24 |
| 2,772,600 | 12/1956 | Walker | 88—24 |
| 3,205,765 | 9/1965 | Zoltai | 88—24 |

NORTON ANSHER, *Primary Examiner.*
RICHARD M. SHEER, *Assistant Examiner.*